US012243554B2

(12) United States Patent
Bar-or et al.

(10) Patent No.: US 12,243,554 B2
(45) Date of Patent: *Mar. 4, 2025

(54) REMOTE INVOCATION OF MOBILE DEVICE ACTIONS (71) Applicant: GOOGLE LLC, Mountain View, CA (US)

(72) Inventors: Omer Bar-or, Mountain View, CA (US); Scott B. Huffman, Portola Valley, CA (US); Ida Mayer, Sunnyvale, CA (US); Arthur E. Blume, Melrose, MA (US); Pravir Kumar Gupta, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,769

(22) Filed: Oct. 27, 2023

(65) Prior Publication Data

US 2024/0055016 A1 Feb. 15, 2024

Related U.S. Application Data (63) Continuation of application No. 17/841,458, filed on Jun. 15, 2022, now Pat. No. 11,848,028, which is a
(Continued)

(51) Int. Cl.
*G10L 25/48* (2013.01)
*G06F 9/451* (2018.01)
(Continued)

(52) U.S. Cl.
CPC .............. *G10L 25/48* (2013.01); *G06F 9/452* (2018.02); *G06F 9/54* (2013.01); *G06F 9/4806* (2013.01);
(Continued)

(58) Field of Classification Search
CPC .......... G06F 9/452; G06F 9/4806; G06F 9/54; G06F 2209/482; G06F 2209/549; G10L 25/48
(Continued)

(56) References Cited

U.S. PATENT DOCUMENTS 6,466,971 B1 10/2002 Humpleman
6,546,419 B1 4/2003 Humpleman
(Continued)

FOREIGN PATENT DOCUMENTS

CN 101017447 8/2007
CN 101151865 3/2008
(Continued)

OTHER PUBLICATIONS

B. Chihani, E. Bertin and N. Crespi, "A user-centric context-aware mobile assistant," 2013 17th International Conference on Intelligence in Next Generation Networks (ICIN), 2013, pp. 110-117, doi: 10.1109/ICIN.2013.6670901. (Year: 2013) (Year: 2013) (Year: 2013) (Year: 2013).*
(Continued)

*Primary Examiner* — Bharatkumar S Shah
(74) *Attorney, Agent, or Firm* — Gray Ice Higdon (57) ABSTRACT Systems, methods and apparatus for invoking actions at a second user device from a first user device. A method includes determining that a first user device has an associated second user device; accessing specification data that specifies a set of user device actions that the second user device is configured to perform; receiving command inputs for the first user device; for each command input, determining whether the command input resolves to one of the user device actions; for each command input not determined to resolve any of the user device actions, causing the command input to be processed at the first user device; and for each
(Continued)

command input determined to resolve one of the user device actions causing the first user device to display in a user interface a dialog by which a user may either accept or deny invoking the user device action at the second user device.

20 Claims, 6 Drawing Sheets

Related U.S. Application Data continuation of application No. 16/990,763, filed on Aug. 11, 2020, now Pat. No. 11,386,915, which is a continuation of application No. 16/177,570, filed on Nov. 1, 2018, now Pat. No. 10,777,216, which is a continuation of application No. 14/311,995, filed on Jun. 23, 2014, now Pat. No. 10,152,987.

(51) Int. Cl.
  *G06F 9/54* (2006.01)
  *G06F 9/48* (2006.01)
(52) U.S. Cl.
  CPC .. *G06F 2209/482* (2013.01); *G06F 2209/549* (2013.01)
(58) Field of Classification Search
  USPC ........................................................ 704/270
  See application file for complete search history.

(56) References Cited

U.S. PATENT DOCUMENTS

| | | | | |
|---|---|---|---|---|
| 6,813,502 | B2* | 11/2004 | Son | H04W 4/02 455/456.3 |
| 7,277,726 | B2 | 10/2007 | Ahya et al. | |
| 7,991,548 | B2* | 8/2011 | Singh | G01C 21/3484 340/995.14 |
| 8,321,916 | B2 | 11/2012 | Aissi | |
| 8,326,279 | B2 | 12/2012 | Aftab | |
| 8,666,367 | B2* | 3/2014 | Sharp | H04W 12/068 701/472 |
| 10,152,987 | B2 | 12/2018 | Bar-or et al. | |
| 10,777,216 | B2 | 9/2020 | Bar-or et al. | |
| 11,386,915 | B2 | 7/2022 | Bar-or et al. | |
| 2005/0105717 | A1 | 5/2005 | Lawrie | |
| 2006/0053194 | A1 | 3/2006 | Schneider | |
| 2008/0037720 | A1* | 2/2008 | Thomson | H04M 3/4931 704/E15.044 |
| 2009/0204410 | A1* | 8/2009 | Mozer | G10L 15/30 704/E15.001 |
| 2010/0081385 | A1* | 4/2010 | Lin | H04W 4/80 455/41.3 |
| 2010/0227605 | A1 | 9/2010 | Fournier | |
| 2010/0304783 | A1* | 12/2010 | Logan | H04M 1/6066 704/235 |
| 2011/0026517 | A1 | 2/2011 | Capuozzo | |
| 2011/0296508 | A1* | 12/2011 | Os | H04L 63/0853 709/237 |
| 2011/0314004 | A1 | 12/2011 | Mehta | |
| 2012/0311583 | A1* | 12/2012 | Gruber | G06Q 10/06316 718/100 |
| 2013/0007202 | A1* | 1/2013 | Lee | G06F 3/016 709/217 |
| 2013/0086594 | A1* | 4/2013 | Cottrell | H04L 61/35 719/318 |
| 2013/0275885 | A1* | 10/2013 | Spataro | H04L 65/403 715/753 |
| 2014/0068736 | A1 | 3/2014 | Agerstam et al. | |
| 2014/0095683 | A1 | 4/2014 | Knowles et al. | |
| 2015/0371664 | A1* | 12/2015 | Bar-Or | G10L 25/48 704/270.1 |
| 2020/0372927 | A1 | 11/2020 | Bar-or et al. | |
| 2022/0310110 | A1 | 9/2022 | Bar-or et al. | |

FOREIGN PATENT DOCUMENTS

| | | |
|---|---|---|
| CN | 101238433 | 8/2008 |
| CN | 101702119 | 5/2010 |
| CN | 101866313 | 10/2010 |
| CN | 102118257 | 7/2011 |
| CN | 102461136 | 5/2012 |
| CN | 102497453 | 6/2012 |
| CN | 102566925 | 7/2012 |
| CN | 102651700 | 8/2012 |
| CN | 102857537 | 1/2013 |
| CN | 103095749 | 5/2013 |
| CN | 103488599 | 1/2014 |
| CN | 103812712 | 5/2014 |
| KR | 1020130001826 | 1/2013 |

OTHER PUBLICATIONS

O. Boyaci, V. Beltran and H. Schulzrinne, "Bridging communications and the physical world: Sense everything, control everything," 2010 IEEE Globecom Workshops, Miami, FL, USA, 2010, pp. 1735-1740, doi: 10.1109/GLOCOMW.2010.5700238. (Year: 2010) (Year: 2010) (Year: 2010).*

B. Chihani, E. Bertin and N. Crespi, "A user-centric context-aware mobile assistant," 2013 17th International Conference on Intelligence in Next Generation Networks (ICIN), 2013, pp. 110-117, doi: 10.1109/ICIN.2013.6670901. (Year: 2013) (Year: 2013) (Year: 2013) (Year: 2013 (Year: 2013).*

O. Boyaci, V. Beltran and H. Schulzrinne, "Bridging communications and the physical world: Sense everything, control everything," 2010 IEEE Globecom Workshops, Miami, FL, USA, 2010, pp. 1735-1740, doi: 10.1109/GLOCOMW.2010.5700238. (Year: 2010) (Year: 2010 (Year: 2010).*

Chihani, B. et al.; A user-centric context-aware mobile assistant; 17th International Conference on Intelligence in Next Generation Networks (ICIN); pp. 110-117; doi: 10.1109/ICIN.2013.6670901; dated 2013.

Boyaci, O. et al.; Bridging communications and the physical world: Sense everything, control everything; IEEE Globecom Workshops, Miami/FL; pp. 1735-1740; doi:10.1109/GLOCOMW.2010.5700238; dated 2010.

European Patent Office; Intention to Grant issued in Application No. 22161682.4, 41 pages, dated Mar. 23, 2023.

European Patent Office; Extended European Search Report issued in Application No. 22161682.4, 10 pages, dated Jul. 11, 2022.

European Patent Office; Intention to Grant issued in Application No. 15733024.2; 7 pages; dated Oct. 5, 2021.

Remote Alarm Clock; Retrieved on Mar. 26, 2014 from the Internet URL: https//play_google.com/store/apps/details?id=com.greatbytes.remotealarmclock; 3 pages; dated Jun. 16, 2013.

Remote API (RAPI; Retrieved on Mar. 26, 2014 from the Internet URL: https://medo.microsoft.com/en-us/library/aa920177.aspx; 2 pages; dated Apr. 8, 2010.

China Patent Office; Office Action issued in Application No. 201580033816.7; 8 pages; dated Sep. 25, 2019.

European Patent Office; Office Action issued in Application No. 15733024.2; 4 pages; dated Aug. 30, 2019.

European Patent Office; International Search Report and Written Opinion issued in Application No. PCT/US2015/035496; 12 pages; dated Sep. 11, 2015.

China National Intellectual Property Administration; Notification of First Office Action issued in Application No. 202010721895.3; 16 pages; dated Jan. 11, 2024.

China National Intellectual Property Administration; Notice of Grant issued in Application No. 202010721895.3; 4 pages; dated May 31, 2024.

* cited by examiner

REMOTE INVOCATION OF MOBILE DEVICE ACTIONS

BACKGROUND

The advent of cloud based services, search engines, and social networks have enabled the digital presence of a user across multiple user devices. In particular, a user may have a user account hosted by a provider of multiple services, and the account may store information that links particular user devices to the account. The user devices may be permanently linked, such as in the case of smart phones, or may be temporarily linked, such as in the case of a laptop that a user uses to sign into an account to perform tasks, such as checking e-mail in a cloud based e-mail service.

The user devices may each have an assortment of applications to facilitate various functions. Such applications may include reader applications, shopping applications, mapping applications, and the like. Many of these applications can be opened by use of command inputs. For example, a user may speak the command [Text Julia I will be late for dinner, I'm stuck in traffic] into a smart phone, and the smart phone, using a command parsing application (or, alternatively, communicating with a command parsing service) will invoke a text application to send the text message "I will be late for dinner, I'm stuck in traffic" to the recipient "Julia," provided, of course, the name "Julia" resolved to an addressable contact.

SUMMARY

This specification relates to command input processing for user devices.

In general, one innovative aspect of the subject matter described in this specification can be embodied in methods that include the actions of determining that a first user device has an associated second user device that is separate from the first user device; accessing specification data for the second user device that specifies a set of user device actions that the second user device is configured to perform; receiving command inputs for the first user device, each command input being a set of terms; for each command input, determining whether the command input resolves to one of the user device actions of the set of user device actions for the second user device; for each command input not determined to resolve to any of the user device actions, causing the command input to be processed at the first user device; and for each command input determined to resolve one of the user device actions: causing the first user device to display in a user interface a dialog by which a user may either accept or deny invoking the user device action at the second user device in response to the command input. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Command inputs at a first user device may be automatically resolved to an action that can be performed by an associated second user device, and thus the user need not invoke any special functions or requests to have the second user device perform the action. Furthermore, as the second user device is updated with new applications, or applications are removed from the second user device, the system updates the specification data of the second user device so command inputs are not resolved to only the actions currently supported by the second user device. This obviates the need for the user to manually update profiles. Users are prompted to confirm performance of the action at the second user device so as to preclude inadvertent triggering of actions at the second user device. This is especially useful when the first user device that the user provided the command input to also support the action to which the command input is resolved. The second user device may be less convenient for invoking commands than the first user device but more effective at executing them, e.g., the keyboards on phones are harder to use than the keyboards on computers.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A command processing system associates first and second user devices with an account, such as a user account. At least one of the user devices, e.g., the second user device, is described by specification data that specifies a set of user device actions that the second user device is configured to perform. The user device actions, for example, may include actions performed by applications loaded on the user device. When a user inputs a command in the first user device, the system determines whether the command input resolves to one of the user device actions of the set of user device actions for the second user device. For example, the command input may be a typed or spoken sequence of terms, and the system parses the terms to determine if the string of terms resolves to a command. If the command input is not determined to resolve to any of the user device actions, then the command input is processed at the first user device. However, if the command is determined to resolve to any of the user device actions, then the first user device displays, in a user interface, a dialog by which a user may either accept or deny invoking the user device action at the second user device. If the user denies invoking the user device action at the second user device, then the command input is processed by the first user device. Conversely, if the user accepts invoking the user device action at the second user device, then the command input is processed by the second user device (and, optionally, also by the first user device).

The command processing system can be implemented in the first user device, or in a computer system separate from both the first and second user devices, such as a server system. These features and additional features are described in more detail below.

Figure 1:
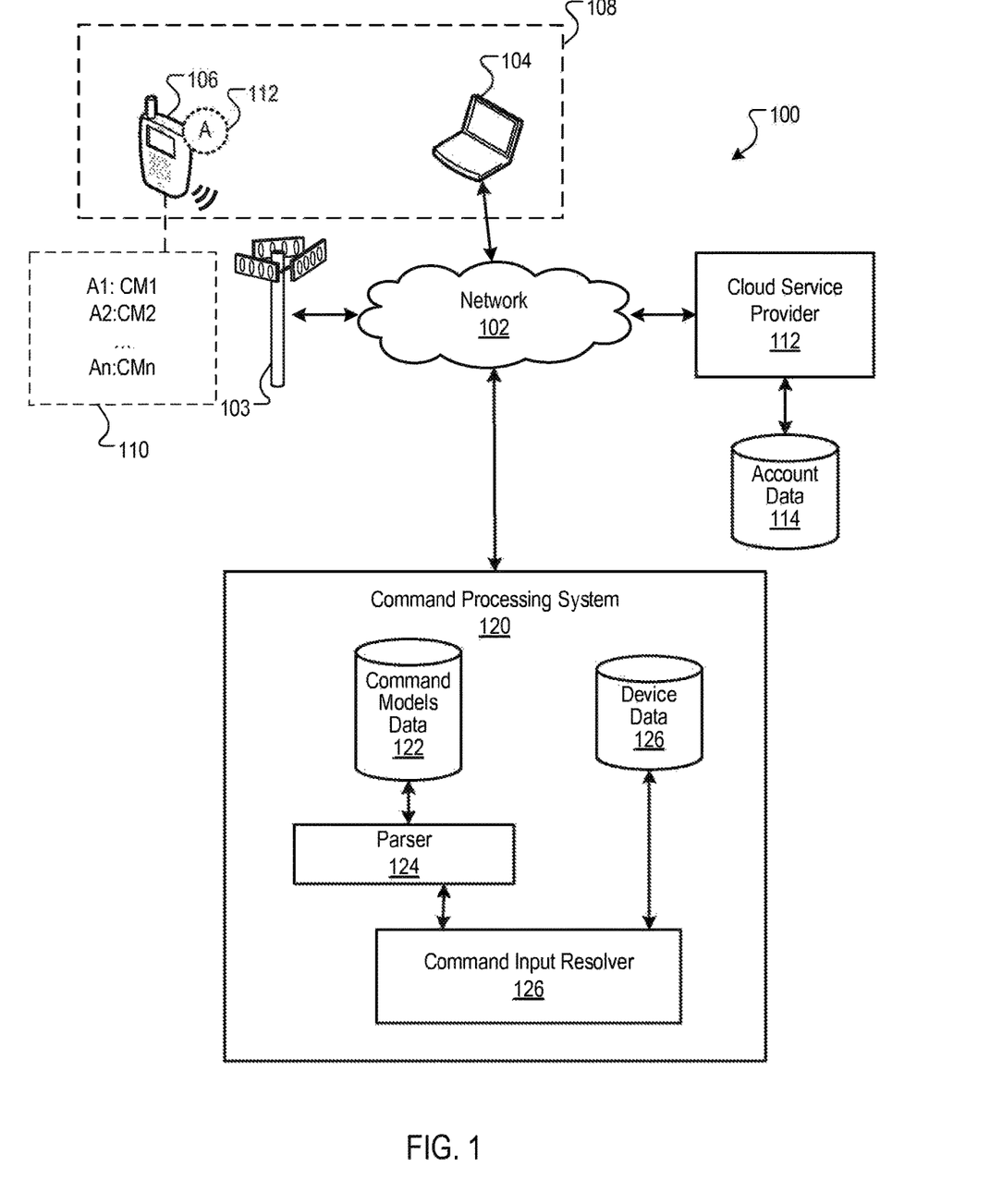
FIG. 1 is a block diagram of an environment in which command inputs are processed for remote invocation of a mobile device action.

FIG. 1 is a block diagram of an environment 100 in which command inputs are processed for remote invocation of a mobile device action. A computer network 102, such as the Internet, or a combination thereof, provides for data communication between electronic devices and systems. The computer network 102 may also be included, or be in data communication with, one or more wireless networks 103 by means of one or more gateways.

User devices 104 and 106 are capable of requesting and receiving resources over the network 102, establishing communication channels, e.g., voice communications, with other user devices, and also capable of performing other actions. Example user devices 104 and 106 include personal computers, mobile communication devices, and other devices that can send and receive data over the network 102. In the example of FIG. 1, the user device 104 is a laptop computer, and the user device 106 is a smart phone. An example smart phone is described with reference to FIG. 5 below. The user devices 104 and 106 may communicate over the networks 102 and 103 by means of wired and wireless connections with the networks 102 and 103.

As described with reference to FIG. 5, a user device may be able to perform a set of device actions for various programs and capabilities. These actions may change over time, as the user may add and remove various programs. The actions may differ from each other for each action. For example, a telephone functionality may include the action of placing a call in response to the commands of "call" or "phone" a particular contact, and may also include the action of "texting" the particular contact in response to the commands to "text" or "message" the particular contact; a calendar application may include the actions of "scheduling" a meeting or reminder in response to the command of "schedule," "accepting" or "declining" an invitation in response to the command to "accept" or "decline," the invitation; a mapping service may include the actions of "mapping" a location in response to the command to "map" a location, and so on.

Likewise, the user device 104 may perform a similar set of actions, depending on capabilities and applications installed on the user device. In some implementations, both devices 104 and 106 utilize a voice recognition system that receives voice input, performs language recognition processing, and parses the resulting recognized words and phrases. The parsed words and phrases, which are referred to as n-grams, where each n-gram may constitute one or more words, are then processed to determine whether the voice input invokes a particular action. A voice recognition and language processing system is not necessary, however, as the devices can also receive textual command inputs as well.

The user devices 104 and 106 are associated with each other by a user account, as indicated by the phantom box 108. For example, a user of the user devices 104 and 106 may have a user account hosted by a cloud service provider 112 that provides multiple services. These services may include web mail, social networking, messaging, documents storage and editing, etc. The account may store account data 114 that links particular user devices to the account so the user can securely access his or her information from various user devices. The user devices may be permanently linked, such as in the case of smart phones, or may be temporarily linked, such as in the case of a laptop that a user uses to sign into an account to perform tasks, such as checking e-mail in a cloud based e-mail service.

The account data 114 may also store specification data for the user devices that specifies software and hardware configurations of the user devices. For example, the account data may store a listing of applications installed on the user devices. In particular, when the cloud service provider 112 also provides the ability to purchase and install applications on the user devices, the account data 114 may store what applications have been purchased, and of those applications, which are installed on the user devices.

A command processing system 120 receives command inputs from user devices and processes the command inputs to determine which, if any, actions are to be taken in response to a command input. While the command processing system 120 is shown as a separate entity in FIG. 1, the command processing system 120 can be implemented in the cloud service provider 112, or even in one of the user devices, such as the user device 104.

In some implementations, each action A1, A2 . . . An that can be performed by a user device has a corresponding command model CM1, CM2 . . . CMn. The command processing system 120 utilizes the command models CMx to determine which, if any, actions are invoked in response to a command input. In some implementations, the command models may be statistical-based, e.g., weights assigned to particular words and phrases that are determined to be semantically relevant to a particular command, or rule-based, e.g., grammars that describe sentence structures for particular commands. The command models data 122 store command models that are each configured to generate an action score for an action for a command input based on semantically relevant words and phrases for the action and semantically irrelevant words and phrases for the action.

A variety of language processing models and training models can be used to generate the command models data 122. In the example of FIG. 1, a parser 124 parses the command input received from a user device and, using the command models data 122, determines which, if any, actions resolve to the command input. For example, assume that grammars are used for command input models. An example set of command input models for the "TEXT" action that sends a text may be:

S→Text to <Recipient> that <Message>
S→Message <Recipient> text <Message>
S→Send <Recipient> text message <Message>

Each grammar may be used to parse a command input. If one of the grammars consumes a command input, then the command input resolves to the action of "TEXT." For example, for the command input [Text to Page that I will pick up groceries on the way home], the parser 124 will successfully parse the command input with the grammar S→Text to <Recipient> that <Message>. The non-terminal <Recipient> consume the text [Page], as Page is a recipient in a contact database for the user; the non-terminal <Message> consumes the text [I will pick up groceries on the way home]; and the remaining terminals "Text to" and "that" consume the remaining text of the command input.

The command models data 122 stores command models for multiple different actions. The command models 122 may be learned, and/or may be specified by application developers. Furthermore, each command model 122, when resolving to a specified action, will also identify corresponding arguments, if any, for the action. For example, the arguments may be specified by the non-terminals, the parser may output the following instruction that causes a text message with the text "I will pick up groceries on the way home" to be sent to a recipient specified by the contact name "Page":

TEXT: <RECIPIENT=PAGE> <MESSAGE=I will pick up groceries on the way home>

The command processing system 120 also stores device data 126 that specifies, for an account, specification data for a user device and the devices associated with the account. The specification data specifies a set of user device actions that a user device is configured to perform. For example, in FIG. 1, the phantom box 110 indicates the specification data for the device specifies n actions, A1 . . . An, that the device 106 is configured to perform. The specification data for each user device may specify a different set of actions for each device, as each device may be configured differently. Furthermore, as the configuration of the user device 106 changes, the command processing system 120 may receive updates from the user device 106 and update the specification data for the user device to reflect the changes.

As described above, a user may input a command on a first user device, such as the user device 104, and the command processing system 120 may process each command input, e.g., by parsing the command input, to determine whether the command input resolves to a user device action that the second user device is configured to perform.

Figure 2:
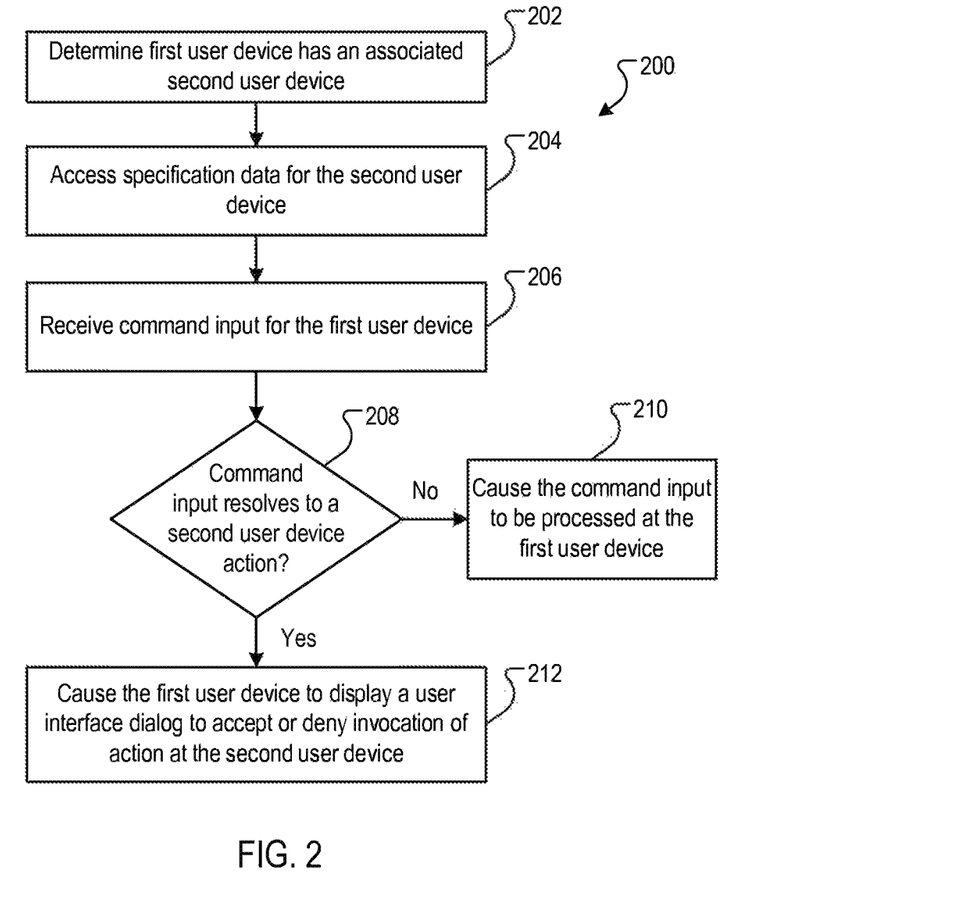
FIG. 2 is a flow diagram of an example process determining when to invoke an action on a remote device.

FIG. 2 is a flow diagram of an example process 200 determining when to invoke an action on a remote device. The process 200 can be implemented in a computer device in which the command processing system 120 is running. In some implementations, the command processing system 120 can be implemented in the first user device 104; in other implementations, the command processing system 120 can be running on a server in data communication with the first user device 104 and the second user device 106. For example, the cloud service provider 112 may run the command processing system 120 on a server in the cloud that communicates with the devices 104 and 106 over the networks 102 and 103.

The process 200 determines a first user device has an associated second user device (202). For example, the command processing system 200 accesses the device data 126 to determine the devices 104 and 106 are associated with the same user account. Contact information for each device is stored in the device data.

The process 200 accesses specification data for the second user device (204). For example, the command processing system 200 accesses the specification data 110 for the device 106.

The process 200 receives a command input for the first user device (206). For example, a user may speak a command into a microphone or type a command into an input field on the user device 104. The command input, if spoken, is a set of terms that may be translated to text using a speech-to-text process. By way of illustration, assume the command input [Make a grocery list eggs, milk, cereal, bread, apples] is received at the first user device 104.

The process 200 determines whether the command input resolves to a second user device action (208). As described above, each action has a corresponding set of command models. If the command input satisfies a command model, e.g., parses successfully to the command model, then the command input is determined to resolve to the action to which the command model corresponds. For example, the user device 106 has an installed application, "GROCERY LISTER," that generates grocery lists in a particular manner, and has the command model S→<Terms1> Grocery list <Grocery Items>

Likewise, assume the user device also has an installed application, "COUPON COLLECTOR," that has the following command model:

S→<Terms1> Grocery <Terms2> <Grocery Item>

In this example, the command input would successfully parse to both command input models. The parser 124 would provide notifications of the successful parse to the command input resolver 126, which then accesses the device data 126 to obtain the specification data 110 for the device 106. The command input resolver 126 thus determines the command input resolves to two user device actions—invocation of the GROCERY LISTER application, and invocation of the COUPON COLLECTOR application.

If the process 200 determines the command input does not resolve to a second user device action, then the process 200 causes the first command input to be processed at the first user device (210). For example, if the command processing system 120 is implemented on the user device 104, the command processing system 120 instructs the user device to process the command at the user device 104. The user device 104 may invoke an application to which the command input resolves. For example, if the user device 106 did not have the GROCERY LISTER and COUPON COLLECTOR applications installed, and the applications are installed on the user device 104, then one or both of the applications may be instantiated at the user device 104.

If the command processing system 120 is implemented separately from the user device 104, then the command processing system 120 sends data to the user device 104 that causes the user device to process the command input.

Conversely, if the process 200 determines the command input does resolve to a second user device action, then the process 200 causes the first user device to display a user interface dialog to accept or deny invocation of action at the second user device (212). Again, if the command processing system 120 is implemented on the user device 104, then the user device will display the dialogs. If the command processing system 120 is implemented separately from the user device 104, then the command processing system 120 sends data to the user device 104 that causes the user device to display the dialogs.

Figure 3A:
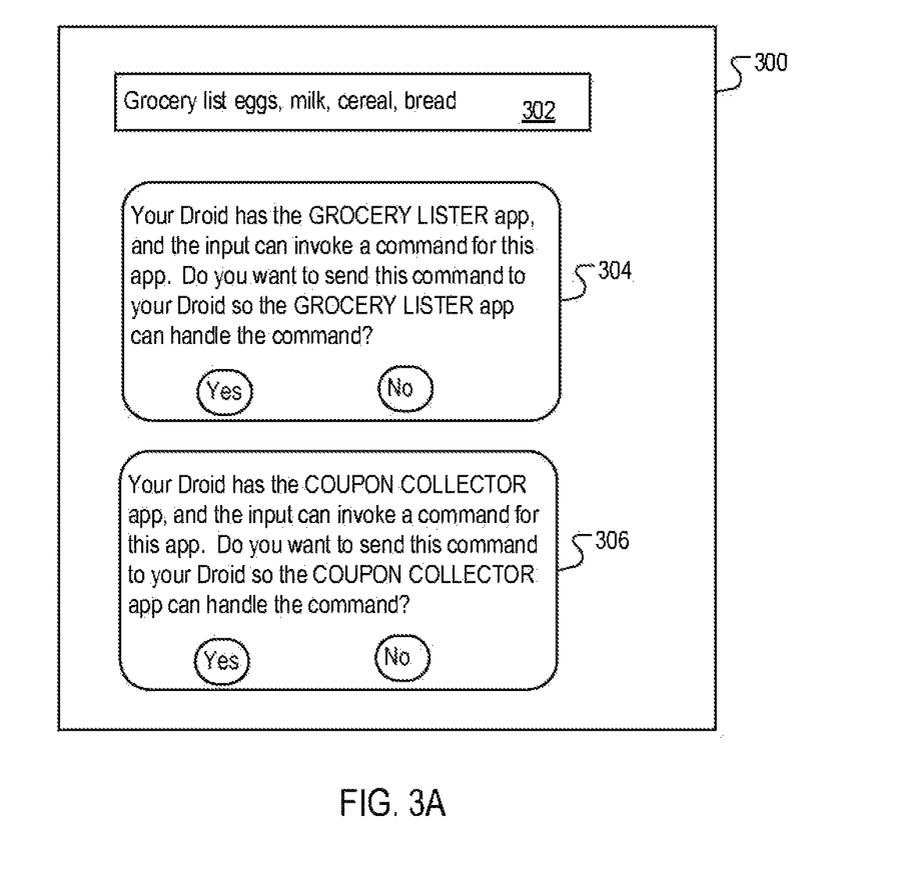
FIG. 3A is an illustration of a user interface at a first user device in which dialogs are presented.

FIG. 3A is an illustration of a user interface 300 at the first user device in which dialogs 304 and 306 are presented in response to the command input 302. For each dialog 304 and 306, a user may either accept or deny invoking the user device action at the second user device in response to the command input by selecting either the "Yes" or "No" button, respectively.

In FIG. 3A, two dialogs are shown because the command input resolved to two actions for two different applications. In some implementations, only one dialog is shown even if the command input resolves to two or more device-supported actions. The dialog that is shown may, for example, correspond to a most likely action to be performed. The likelihoods can be determined by how well the command input parses to particular command models, user history of selections, and other data that can be used to determine a likelihood.

Figure 3B:
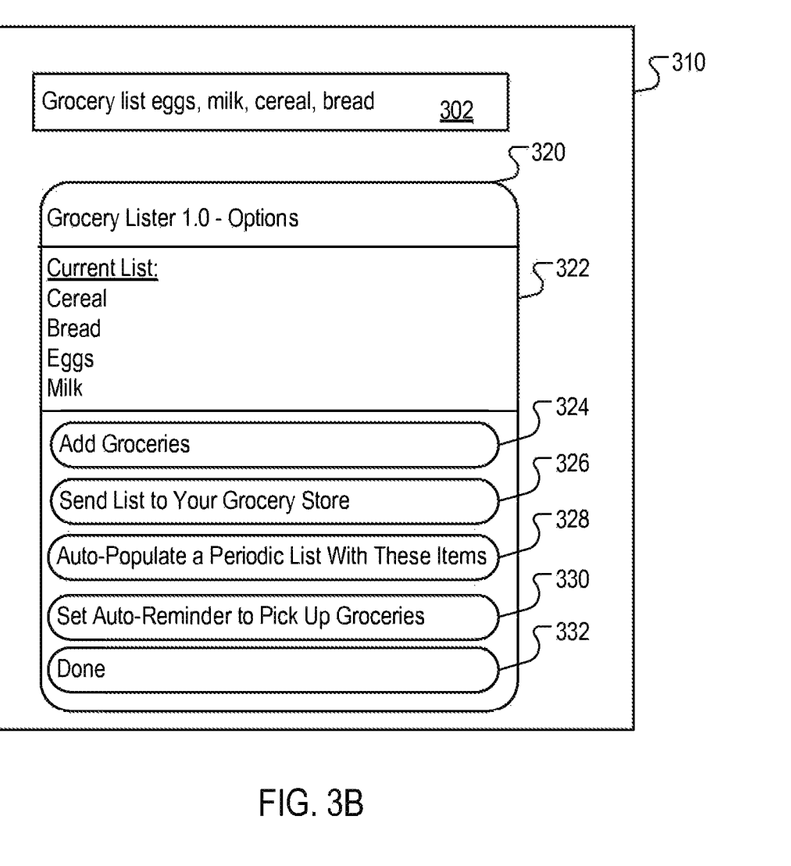
FIG. 3B is an illustration of another user interface at the first user device in which action-specific options are displayed.

In some implementations, once a user has confirmed a particular device supported action for a second user device, options specific to that action may be displayed at the first user device. For example, FIG. 3B is an illustration of another user interface 310 at the first user device in which action-specific options are displayed. A dialog 320 is shown in response to selecting the "Yes" option of the dialog 304 of FIG. 3A. The dialog 320 includes a listing 322 generated in response to the command input 302 and action-specific options 324, 326, 328, 330, and 332. The options are specific to the invocation of a "Grocery Lister" application action for the second user device, and correspond to options supported by the application or service. Selection of a corresponding action-specific option may, in turn, generate additional action options or inputs, e.g., additional menu options, a drop-down list of selectable parameter values, etc.

Figure 4:
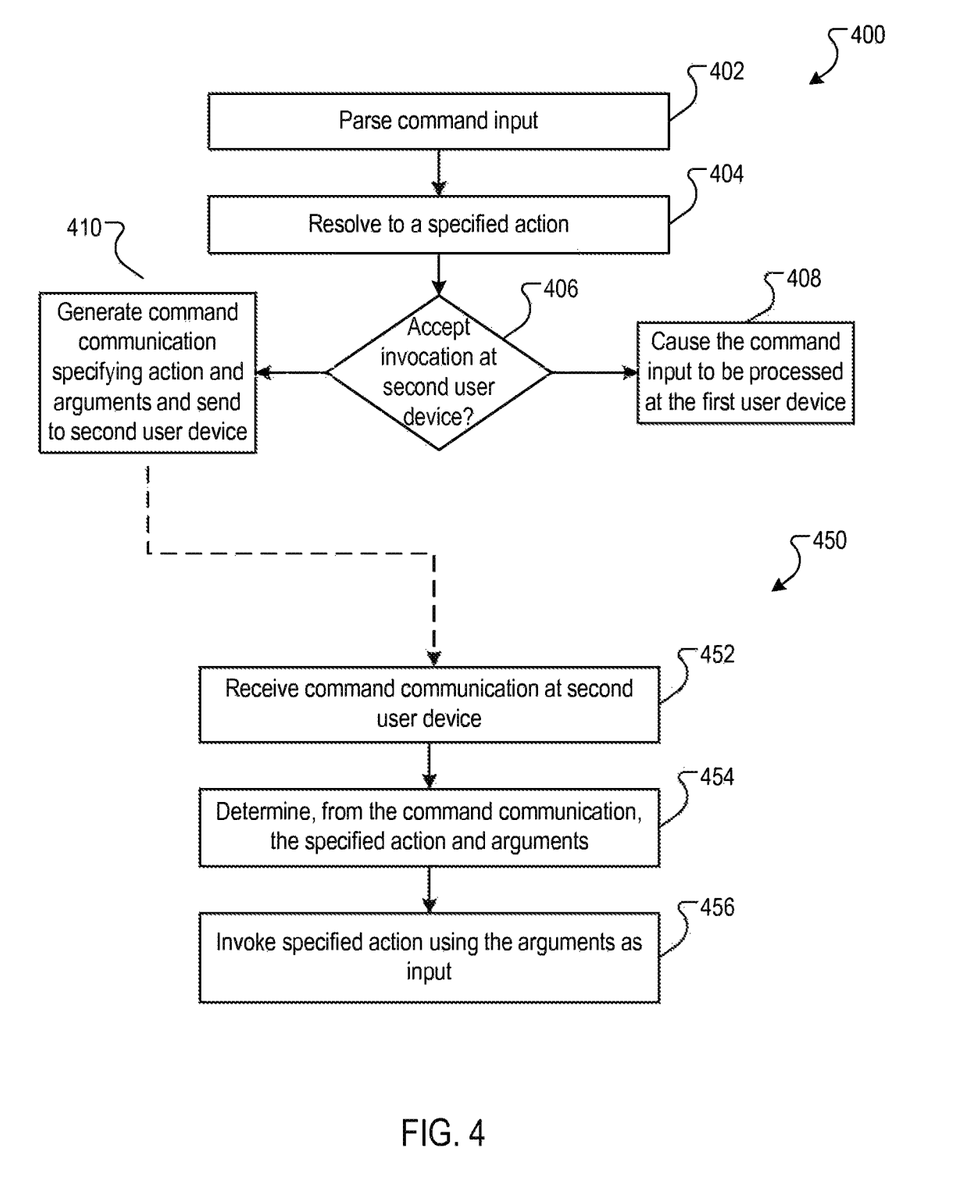
FIG. 4 is a flow diagram of distributed processes for invoking a command at a remote device in response to a dialog.

FIG. 4 is a flow diagram of distributed processes 400 and 450 for invoking a command at a remote device in response to a dialog. The process 400 is performed by the command processing system 130, and the process 450 is performed by the second user device 106.

The process 400 parses the command input (402), and then resolves the command input to a specified action (404). The parsing and resolving are the same as described above, and in response, a dialog is shown on the user interface of the first user device 104.

The process 400 determines whether the user accepted the option to invoke the action at the second user device (406). For example, for an action, the command processing system 130 receives data indicating whether the user selected either the "Yes" command or the "No" command.

If the user selects the "No" command, then the process 400 determines the user did not accept the option to invoke the action at the second user device. The process 400 then causes the command input to be processed at the first user device (408), as described above.

Conversely, if the user selects the "Yes" command, then the process 400 determines the user did accept the option to invoke the action at the second user device. The process 400 then generates a command communication specifying the action and the arguments and sends the command communication to second user device (410). For example, assume the user selected "Yes" for both dialogs 304 and 306. The command input resolver 126 may generate corresponding commands for each of the GROCERY LISTER and COUPON COLLECTOR applications. The parser 124 passes to the command input resolver 126 the name of the application to be invoked, and the arguments. The command input resolver 126, in turn, accesses data describing the command formats for each application and generates the command data. Each command model may also specify a particular function for the application to perform if the application performs more than one function. For example, assume the command formats for each application are of the form:

<APP NAME>:<FUNCTION>:<ARGUMENTS>

For the command models that parsed to the command input, the function for the GROCERY LISTER application may be "LIST GEN," which causes the application to generate a list of groceries listed in the argument list, and the function for the COUPON COLLECTOR may be "COUPON REQUEST" which causes the application to request coupons that are relevant to groceries listed in the argument list. Accordingly, the command data may be:

[GROCERY LISTER:LIST GEN:eggs, milk, cereal, bread]
[COUPON COLLECTOR:COUPON REQUEST:eggs, milk, cereal, bread]

At the second user device, the process 450 receives the command communication (452). For example, the user device 106 receives a message that includes the command data described above. The command communication may be sent immediately in response to the user selecting the "Yes" option, or, alternatively, may be queued and pushed to the user device 106 according to a push schedule. Any appropriate message format and protocol may be used to provide the command data to the user device 106.

The process 450 determines, from the command communication, the specified action and arguments (454). The message may be processed by an API 112 installed on the user device 106 that processes each command to determine which application or service is specified, what action is to be informed, and what arguments.

The process 450 invokes the specified action using the arguments as input (456). For example, the user device 106, by use of the API 112, instantiates the specified application, the specified function (if any function is specified), and passes the specified arguments (if any are specified or required) as input.

Figure 5:
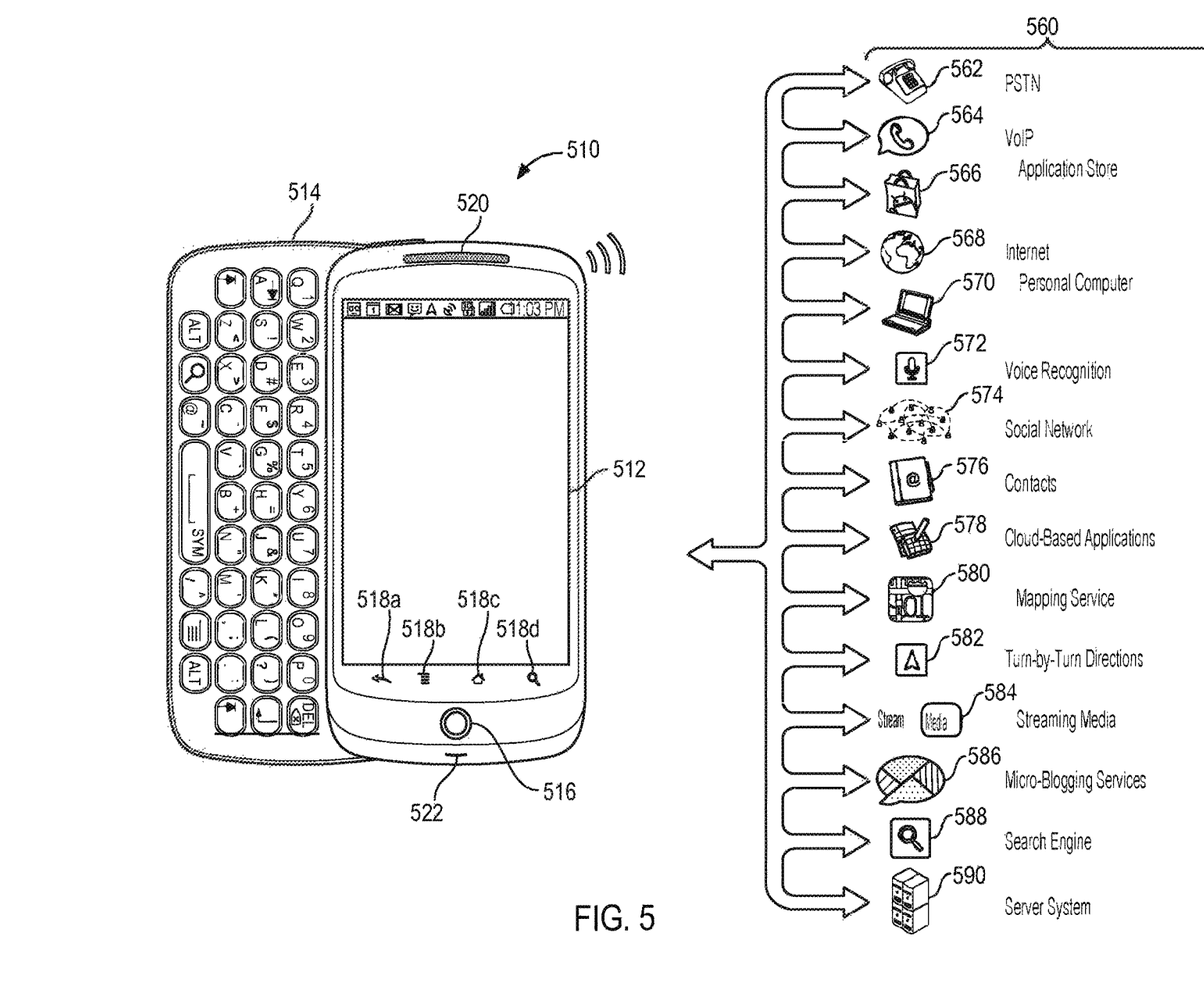
FIG. 5 is a block diagram of an example mobile computing device.

FIG. 5 is a block diagram of example mobile computing device. In this illustration, the mobile computing device 510 is depicted as a handheld mobile telephone (e.g., a smartphone, or an application telephone) that includes a touchscreen display device 512 for presenting content to a user of the mobile computing device 510 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 514, physical buttons, trackballs, accelerometers, gyroscopes, and magnetometers).

Example visual output mechanism in the form of display device 512 may take the form of a display with resistive or capacitive touch capabilities. The display device may be for displaying video, graphics, images, and text, and for coordinating user touch input locations with the location of displayed information so that the device 510 can associate user contact at a location of a displayed item with the item. The mobile computing device 510 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 514, which may be a full qwerty keyboard or a traditional keypad that includes keys for the digits '0-9', '*', and ' #.' The keyboard 514 receives input when a user physically contacts or depresses a keyboard key. User manipulation of a trackball 516 or interaction with a track pad enables the user to supply directional and rate of movement information to the mobile computing device 510 (e.g., to manipulate a position of a cursor on the display device 512).

The mobile computing device 510 may be able to determine a position of physical contact with the touchscreen display device 512 (e.g., a position of contact by a finger or a stylus). Using the touchscreen 512, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 512 that corresponds to each key.

The mobile computing device 510 may include mechanical or touch sensitive buttons 518*a-d*. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. The operating system may provide a platform for the execution of application programs that facilitate interaction between the computing device and a user.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 504. User-selection of the button may invoke the pre-defined action.

The mobile computing device 510 may include other applications, computing sub-systems, and hardware. A voice recognition service 572 may receive voice communication data received by the mobile computing device's microphone 522, and translate the voice communication into corresponding textual data or perform voice recognition. The processed voice data can be input to the command models stored in the command models data 122 to determine whether the voice input used to generate the voice data invokes a particular action for a particular application as described above. One or more of the applications, services and units below may have corresponding actions invoked by such voice commands.

A call handling unit may receive an indication of an incoming telephone call and provide a user the capability to answer the incoming telephone call. A media player may allow a user to listen to music or play movies that are stored in local memory of the mobile computing device 510. The mobile device 510 may include a digital camera sensor, and corresponding image and video capture and editing software. An internet browser may enable the user to view content from a web page by typing in an addresses corresponding to the web page or selecting a link to the web page.

A service provider that operates the network of base stations may connect the mobile computing device 510 to the network 550 to enable communication between the mobile computing device 510 and other computing systems that provide services 560. Although the services 560 may be provided over different networks (e.g., the service provider's internal network, the Public Switched Telephone Network, and the Internet), network 550 is illustrated as a single network. The service provider may operate a server system 552 that routes information packets and voice data between the mobile computing device 510 and computing systems associated with the services 560.

The network 550 may connect the mobile computing device 510 to the Public Switched Telephone Network (PSTN) 562 in order to establish voice or fax communication between the mobile computing device 510 and another computing device. For example, the service provider server system 552 may receive an indication from the PSTN 562 of an incoming call for the mobile computing device 510. Conversely, the mobile computing device 510 may send a communication to the service provider server system 552 initiating a telephone call using a telephone number that is associated with a device accessible through the PSTN 562.

The network 550 may connect the mobile computing device 510 with a Voice over Internet Protocol (VoIP) service 564 that routes voice communications over an IP network, as opposed to the PSTN. For example, a user of the mobile computing device 510 may invoke a VoIP application and initiate a call using the program. The service provider server system 552 may forward voice data from the call to a VoIP service, which may route the call over the internet to a corresponding computing device, potentially using the PSTN for a final leg of the connection.

An application store 566 may provide a user of the mobile computing device 510 the ability to browse a list of remotely stored application programs that the user may download over the network 550 and install on the mobile computing device 510. The application store 566 may serve as a repository of applications developed by third-party application developers. An application program that is installed on the mobile computing device 510 may be able to communicate over the network 550 with server systems that are designated for the application program. For example, a VoIP application program may be downloaded from the Application Store 566, enabling the user to communicate with the VoIP service 564.

The mobile computing device 510 may access content on the internet 568 through network 550. For example, a user of the mobile computing device 510 may invoke a web browser application that requests data from remote computing devices that are accessible at designated universal resource locations. In various examples, some of the services 560 are accessible over the internet.

The mobile computing device may communicate with a personal computer 570. For example, the personal computer 570 may be the home computer for a user of the mobile computing device 510. Thus, the user may be able to stream media from his personal computer 570. The user may also view the file structure of his personal computer 570, and transmit selected documents between the computerized devices.

The mobile computing device 510 may communicate with a social network 574. The social network may include numerous members, some of which have agreed to be related as acquaintances. Application programs on the mobile computing device 510 may access the social network 574 to retrieve information based on the acquaintances of the user of the mobile computing device. For example, an "address book" application program may retrieve telephone numbers for the user's acquaintances. In various examples, content may be delivered to the mobile computing device 510 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 510 may access a personal set of contacts 576 through network 550. Each contact may identify an individual and include information about that individual (e.g., a phone number, an email address, and a birthday). Because the set of contacts is hosted remotely to the mobile computing device 510, the user may access and maintain the contacts 576 across several devices as a common set of contacts.

The mobile computing device 510 may access cloud-based application programs 578. Cloud-computing provides application programs (e.g., a word processor or an email program) that are hosted remotely from the mobile computing device 510, and may be accessed by the device 510 using a web browser or a dedicated program.

Mapping service 580 can provide the mobile computing device 510 with street maps, route planning information, and satellite images. The mapping service 580 may also receive queries and return location-specific results. For example, the mobile computing device 510 may send an estimated location of the mobile computing device and a user-entered query for "pizza places" to the mapping service 580. The mapping service 580 may return a street map with "markers" superimposed on the map that identify geographical locations of nearby "pizza places."

Turn-by-turn service 582 may provide the mobile computing device 510 with turn-by-turn directions to a user-supplied destination. For example, the turn-by-turn service 582 may stream to device 510 a street-level view of an estimated location of the device, along with data for providing audio commands and superimposing arrows that direct a user of the device 510 to the destination.

Various forms of streaming media 584 may be requested by the mobile computing device 510. For example, computing device 510 may request a stream for a pre-recorded video file, a live television program, or a live radio program.

A micro-blogging service 586 may receive from the mobile computing device 510 a user-input post that does not identify recipients of the post. The micro-blogging service 586 may disseminate the post to other members of the micro-blogging service 586 that agreed to subscribe to the user.

A search engine 588 may receive user-entered textual or verbal queries from the mobile computing device 510, determine a set of internet-accessible documents that are responsive to the query, and provide to the device 510 information to display a list of search results for the responsive documents. In examples where a verbal query is received, the voice recognition service 572 may translate the received audio into a textual query that is sent to the search engine.

These and other services may be implemented in a server system 590. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of what may be claimed, but rather as descriptions of features specific to particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by one or more processors, the method comprising:
receiving a command input for a first user device;
determining that the command input resolves to a first user device action that a second user device is configured to perform using a first application accessible to the second user device;
in response to determining that the command input resolves to the first user device action, generating data that causes the first user device to prompt a user of the first user device to either accept or deny invoking the first user device action that the second user device is configured to perform using the first application, in response to the command input; and
in response to the user of the first user device accepting invoking the first user device action:
generating a command communication that causes the second user device to invoke the first user device action using the first application and process the command input as input for the first user device action; and
sending the command communication to the second user device.

2. The method according to claim 1, wherein the second user device is a smart phone.

3. The method according to claim 1, wherein generating the data that causes the first user device to prompt the user of the first user device comprises displaying at least one dialog in a user interface of the first user device by which the user of the first user device may either accept or deny invoking the first user device action that the second user device is configured to perform using the first application.

4. The method according to claim 3, wherein the user of the first user device accepting invoking the first user device action comprises selecting a button in the at least one dialog in the user interface.

5. The method according to claim 1, further comprising, in response to the user of the first user device accepting invoking the first user device action, displaying, in the user interface of the first user device, options specific to the first user device action.

6. The method according to claim 1, further comprising:
determining that the command input also resolves to a second user device action that the second user device is configured to perform using a second application accessible to the second user device; and
in response to determining that the command input also resolves to the second user device action, generating data that causes the first user device to prompt the user of the first user device to either accept or deny invoking the second user device action that the second user device is configured to perform using the second application, in response to the command input.

7. The method according to claim 6, further comprising, in response to the user of the first user device accepting invoking the second user device action:
generating an additional command communication that includes data that causes the second user device to invoke the second user device action using the second application and process the command input as input for the second user device action; and
sending the additional command communication to the second user device.

8. The method according to claim 6, wherein:
generating the data that causes the first user device to prompt the user of the first user device comprises displaying at least one dialog in a user interface of the first user device by which the user of the first user device may either accept or deny invoking at least one of the first user device action that the second user device is configured to perform using the first application and the second user device action that the second user device is configured to perform using the second application; and
the at least one dialog comprises:
a first dialog in the user interface of the first user device by which the user of the first user device may either accept or deny invoking the first user device action that the second user device is configured to perform using the first application; and
a second dialog in the user interface of the first user device by which the user of the first user device may either accept or deny invoking the second user device action that the second user device is configured to perform using the second application.

9. A computer program product comprising one or more non-transitory computer-readable storage media having program instructions collectively stored on the one or more non-transitory computer-readable storage media, the program instructions executable to:
receive a command input for a first user device;
determine that the command input resolves to a first user device action that a second user device is configured to perform using a first application accessible to the second user device;
in response to determining that the command input resolves to the first user device action, generate data that causes the first user device to prompt a user of the first user device to either accept or deny invoking the first user device action that the second user device is configured to perform using the first application, in response to the command input; and
in response to the user of the first user device accepting invoking the first user device action:
generate a command communication that causes the second user device to invoke the first user device action using the first application and process the command input as input for the first user device action; and
send the command communication to the second user device.

10. The computer program product according to claim 9, wherein the second user device is a smart phone.

11. The computer program product according to claim 9, wherein generating the data that causes the first user device to prompt the user of the first user device comprises displaying at least one dialog in a user interface of the first user device by which the user of the first user device may either accept or deny invoking the first user device action that the second user device is configured to perform using the first application.

12. The computer program product according to claim 11, wherein the user of the first user device accepting invoking the first user device action comprises selecting a button in the at least one dialog in the user interface.

13. The computer program product according to claim 9, wherein the program instructions are further executable to, in response to the user of the first user device accepting invoking the first user device action, display, in the user interface of the first user device, options specific to the first user device action.

14. The computer program product according to claim 9, wherein the program instructions are further executable to:

determine that the command input also resolves to a second user device action that the second user device is configured to perform using a second application accessible to the second user device; and in response to determining that the command input also resolves to the second user device action, generate data that causes the first user device to prompt the user of the first user device to either accept or deny invoking the second user device action that the second user device is configured to perform using the second application, in response to the command input.

15. The computer program product according to claim 14, wherein the program instructions are further executable to, in response to the user of the first user device accepting invoking the second user device action:

generate an additional command communication that includes data that causes the second user device to invoke the second user device action using the second application and process the command input as input for the second user device action; and send the additional command communication to the second user device.

16. The computer program product according to claim 14, wherein:

generating the data that causes the first user device to prompt the user of the first user device comprises displaying at least one dialog in a user interface of the first user device by which the user of the first user device may either accept or deny invoking at least one of the first user device action that the second user device is configured to perform using the first application and the second user device action that the second user device is configured to perform using the second application; and the at least one dialog comprises:
a first dialog in the user interface of the first user device by which the user of the first user device may either accept or deny invoking the first user device action that the second user device is configured to perform using the first application; and
a second dialog in the user interface of the first user device by which the user of the first user device may either accept or deny invoking the second user device action that the second user device is configured to perform using the second application.

17. A system comprising:

a processor, a computer-readable memory, one or more computer-readable storage media, and program instructions collectively stored on the one or more computer-readable storage media, the program instructions executable to:

receive a command input for a first user device;

determine that the command input resolves to a first user device action that a second user device is configured to perform using a first application accessible to the second user device;

in response to determining that the command input resolves to the first user device action, generate data that causes the first user device to prompt a user of the first user device to either accept or deny invoking the first user device action that the second user device is configured to perform using the first application, in response to the command input; and in response to the user of the first user device accepting invoking the first user device action:
generate a command communication that causes the second user device to invoke the first user device action using the first application and process the command input as input for the first user device action; and
send the command communication to the second user device.

18. The system according to claim 17, wherein the second user device is a smart phone.

19. The system according to claim 17, wherein generating the data that causes the first user device to prompt the user of the first user device comprises displaying at least one dialog in a user interface of the first user device by which the user of the first user device may either accept or deny invoking the first user device action that the second user device is configured to perform using the first application.

20. The system according to claim 19, wherein the user of the first user device accepting invoking the first user device action comprises selecting a button in the at least one dialog in the user interface.

\* \* \* \* \*